US006778527B1

(12) United States Patent
Amin

(10) Patent No.: US 6,778,527 B1
(45) Date of Patent: *Aug. 17, 2004

(54) METHOD AND APPARATUS FOR DATA NETWORK CALL PROCESSING

(75) Inventor: Umesh J. Amin, Redmond, WA (US)

(73) Assignee: AT&T Wireless Services, Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/451,401

(22) Filed: Nov. 30, 1999

Related U.S. Application Data

(63) Continuation of application No. 08/762,550, filed on Dec. 9, 1996, now Pat. No. 6,118,778.

(51) Int. Cl.$^7$ .......................... H04L 12/66; H04M 3/24
(52) U.S. Cl. ...................... 370/352; 370/241; 379/308
(58) Field of Search ................................ 370/351, 352, 370/353, 354, 355, 356, 389, 390, 310, 312, 455, 465, 464, 466, 467, 474, 475, 480, 493, 432; 379/90.01, 93.01, 93.09, 88.17, 88.19, 211.01, 280, 308, 309, 27.01, 28, 29.01, 32.01, 265.01, 265.11, 211.02, 211.04; 455/445

(56) References Cited

U.S. PATENT DOCUMENTS

| 4,661,972 | A | | 4/1987 | Kai ........................... 340/7.21 |
|---|---|---|---|---|
| 5,600,704 | A | * | 2/1997 | Ahlberg et al. ............. 455/445 |
| 5,724,409 | A | * | 3/1998 | Malik et al. ........... 379/211.02 |
| 5,726,984 | A | * | 3/1998 | Kubler et al. ............... 370/349 |
| 5,802,160 | A | * | 9/1998 | Kugell et al. .......... 379/211.04 |
| 5,825,865 | A | * | 10/1998 | Oberlander et al. ... 379/211.02 |
| 6,118,778 | A | * | 9/2000 | Amin .......................... 370/352 |
| 6,366,575 | B1 | * | 4/2002 | Barkan et al. .............. 370/352 |
| 6,377,576 | B1 | * | 4/2002 | Zwick et al. ................ 370/389 |

FOREIGN PATENT DOCUMENTS

| CA | 2141578 | 12/1994 | ............ H04M/3/54 |
|---|---|---|---|
| CA | 2167810 | 11/1996 | ............ H04Q/7/22 |
| WO | WO96/38018 | 11/1996 | ........... H04Q/11/04 |

OTHER PUBLICATIONS

Low, C., "The Internet Telephony Red Herring", in HP Laboratories Technical Report, May 15, 1996, pp. 1–15.
Canadian Intellectual Property Office (CIPO), Search Report for Canadian Application No. 2,220,707, Mar. 7, 2000, 3 pages.

* cited by examiner

Primary Examiner—Brian Nguyen

(57) ABSTRACT

A method and apparatus for processing data network communication calls. A calling party device sends a call initiation request to a packet data network node from a computer. The request includes identifications of alternate calling party devices along with respective priority for each device. The packet data network node determines the highest priority called party device which is available and initiates communication between the calling party device and the called party device. The called party device may be, for example, a computer, a landline telephone, a wireless mobile station, or a pager. If the called party device is a telephone, the packet data network node establishes a data network connection with the calling party computer and a telephone connection with the called party telephone and performs the required conversions to allow communication between the calling party computer and the called party telephone.

12 Claims, 3 Drawing Sheets

METHOD AND APPARATUS FOR DATA NETWORK CALL PROCESSING

CROSS REFERENCE TO RELATED APPLICATIONS

This application is a continuation of U.S. patent application Ser. No. 08/762,550, filed Dec. 9, 1996, now U.S. Pat. No. 6,118,778.

FIELD OF THE INVENTION

This invention relates generally to call processing and more particularly to call processing in data networks.

BACKGROUND OF THE INVENTION

Packet data networks, such as the Internet, are becoming increasingly popular. Such packet data networks are used for various communication purposes, such as file transfer, email, and distribution of multimedia information (e.g. the World Wide Web). Recently, packet data networks have been employed for telephony calls.

Specialized computer software is available which allows parties connected to the Internet via a computer to carry on a voice conversation. On the transmission end, the software configures the computer to receive voice signals from a user (e.g. from a microphone connected to the computer), convert the voice signals into packet data appropriate for transmission via the Internet, and transmit the signals to the other party via the Internet. On the receiving end, the software configures the computer to receive the packet data from the Internet, convert the packet data to voice signals, and to send to the voice signals to a speaker such that a user can hear the voice of the transmitting party.

Many users of packet data voice communication software do not have direct connections to the Internet. Such users connect their computers to the Internet via a telephone line connection and a modem. The user connects to the Internet by placing a modem call to an Internet access provider (IAP), which then provides the user with a connection to the Internet.

One problem with Internet telephony is that users at both ends of the communication must be connected to the Internet prior to establishing the telephony connection. This is because there is no way to notify a user that an Internet telephony call is waiting unless that user's computer is connected to the Internet. This results in a problem because, as state above, most Internet users do not have a direct and permanent connection to the Internet, rather they place a modem call to an IAP when they desire to connect to the Internet. In the context of Internet telephony, this means that both ends of the Internet call must know a particular time when the conversation is desired, and be sure to be connected at that time. One way to accomplish this is to have a predetermined time for the call. However, this is undesirable in that people's schedules often change and thus a predetermined time may be difficult to establish. Another problem with a predetermined time is that a voice call is often initiated by a calling party to the called party and the exact time of such initiation is unknown to the called party. One way to deal with this is that the calling party first places a conventional telephone call to the called party and requests that the called party connect a computer to the Internet in anticipation of an Internet telephony call from the calling party. Both parties then terminate the conventional telephone call, connect their respective computers to the Internet via their IAPs, and the Internet telephony call may then be established. This solution is both inconvenient and costly because it requires a conventional telephone call (often long distance) to be placed for the sole purpose of setting up an Internet telephony call.

Thus, it would be desirable to have a system and method for more efficient packet data network telephony call processing.

SUMMARY OF THE INVENTION

The present invention provides a method and apparatus for improved processing of data network communication calls. In accordance with the invention, a network node receives a call initiation request from a calling party device wherein the call initiation request includes information describing alternative called party devices and the relative priority of each device. This call initiation request informs the network node as to which called party device(s) the calling party wishes to initiate communication with and the priority to give to each device. Upon receipt of the call initiation request, the network node determines the highest priority called party device which is available and establishes communication between the calling party device and the highest priority called party device which is available.

In accordance with another aspect of the invention, the calling party device is a computer and the highest priority called party device which is available is a computer. In accordance with this aspect of the invention, the network node establishes a data network communication call in which voice data is passed between the computers in order to facilitate a voice call.

In accordance with another aspect of the invention, the calling party device is a computer and the highest priority called party device which is available is a telephone connected to the public switched telephone network. In accordance with this aspect of the invention, the network node establishes a data network connection with the calling party computer and a telephone connection with the called party telephone. The network node converts voice data received from the calling party computer into voice signals and transmits the voice signals to the called party telephone via the telephone network. The network node also converts voice signals received from the called party into voice data and transmits the voice data to the calling party computer via the data network.

In accordance with another aspect of the invention the calling party device is a computer and the highest priority called party device which is available is a mobile station connected to a wireless communication network. In accordance with this aspect of the invention, the network node establishes a data network connection with the calling party computer and a telephone connection with the called party telephone via the wireless communication network. The network node converts voice data received from said calling party computer into voice signals and transmits the voice signals to the called party telephone. The network node also converts voice signals received from the called party into voice data and transmits the voice data to the calling party computer.

In accordance with another aspect of the invention the calling party device is a computer and the highest priority called party device which is available is a pager connected to a paging network. In accordance with this aspect of the invention the network node sends an appropriate data paging signal to the paging network.

In accordance with another aspect of the invention the network node sends status messages to the calling party device.

In accordance with another aspect of the invention, the call initiation request contains information describing alternative called party devices, but may not contain relative priority of each called party device. In this embodiment, the packet data network node attempts to initiate communication with all of the devices specified in the call initiation request concurrently by sending an appropriate request to each of the devices. The network node establishes communication between the calling party and the first called party device which responds to the request, or to the first called party device which becomes available.

These and other advantages of the invention will be apparent to those of ordinary skill in the art by reference to the following detailed description and the accompanying drawings.

DETAILED DESCRIPTION

Figure 1:
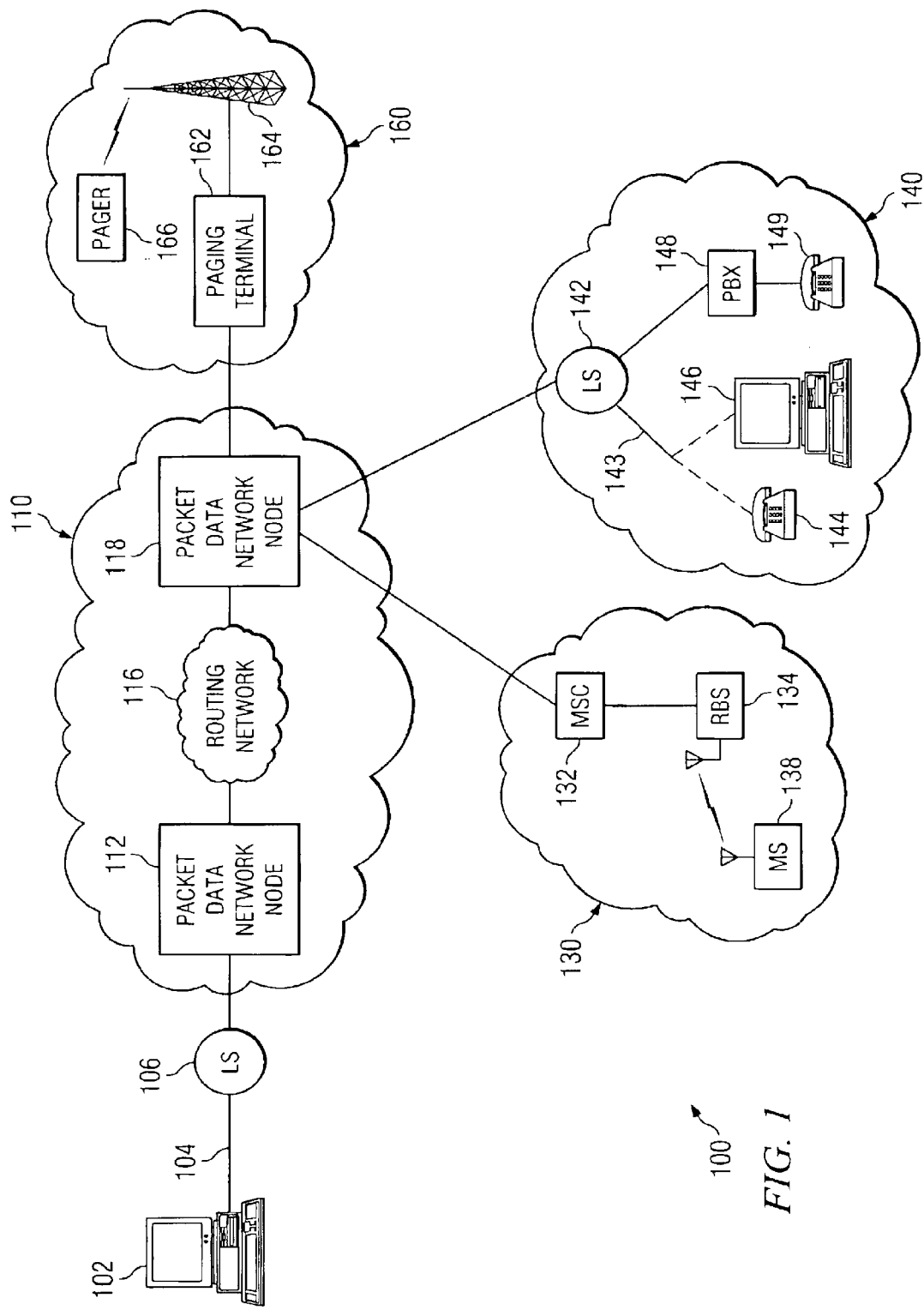
FIG. 1 shows a communication system in which the present invention may be employed.

A communication system 100 in which the present invention may be employed is shown in FIG. 1. A calling party computer 102 is connected to a telephone local switch (LS) 106 via line 104. In one embodiment of the invention line 104 is a telephone line from a house to a local telephone company LS 106 which is part of the public switched telephone network (PSTN). As discussed in the background of the invention, this is a standard telephone line which links a home telephone to the PSTN and is generally shared by a convention telephone (not shown) and with computer equipment. In practice, a user of computer 102 will typically have a conventional telephone connected to the LS 106 via line 104, and will only have computer 102 connected to the LS 106 when connection to a data network is desired. It is noted that in other embodiments of the invention, line 104 may be a wireless communication link and the LS 106 may be a switch of a wireless telephone network.

LS 106 is connected to a packet data network 110. Packet data network 110 includes packet data network nodes 112, 118, and routing network 116, as shown. The packet data network nodes 112, 118 are nodes which generally belong to a packet data network access provider (PDNAP). A PDNAP provides subscribers with access to the packet data network 110. The packet data network nodes 112, 118 are connected to each other, and to other elements of the packet data network (not shown) via a routing network 116. One such packet data network which is well known in the art is the Internet.

It is also noted that calling party computer 102 may have a direct connection to the packet data network node 112 and thus a direct connection to packet data network 110.

Packet data network node 118 is connected to a wireless communication network 130 comprising a mobile switching center (MSC) 132, a radio base station (RBS) 134, and a mobile station (MS) 138, which will be described in further detail below. Packet data network node 118 is also connected to the PSTN 140 comprising a LS 142, telephones 144, 149, computer 146, and private branch exchange (PBX) 148, which will be described in further detail below. Packet data network node 118 is also connected to a paging network 160 comprising a paging terminal 162, an antenna 164, and a pager 166, which will be described in further detail below.

In the embodiment shown in FIG. 1, packet data network node 118 is shown being directly connected to wireless communication network 130, PSTN 140, and paging network 160. In an alternative embodiment, packet data network node 118 may be connected to wireless communication network 130, PSTN 140, and paging network 160 through some intermediate node, such as a local exchange carrier switch, an access tandem, the PSTN, or some other type of intermediate access switch.

In operation, assume a calling party associated with computer 102 wishes to establish a packet data network voice telephony session with a called party associated with computer 146. Assume that the called party also has an associated: telephone 144 which shares with the computer 146 a single line 143 to the LS 142; telephone 149 connected to PBX 148 (e.g. an office telephone); a mobile station 138 (e.g. cellular telephone); and pager 166.

In accordance with the invention, if the calling party wishes to initiate a packet data network communication with the called party, the calling party connects computer 102 to the packet data network 110 via line 104 and LS 106, and sends a call initiation data packet to the packet data network node 112. The call initiation data packet contains information indicating the calling party preferences regarding which of the alternative called party devices (138, 144, 146, 149, 166) the calling party wishes to communicate with. The call initiation data packet also includes priority information indicating the relative priority which the calling party assigns to the devices.

Figure 2:
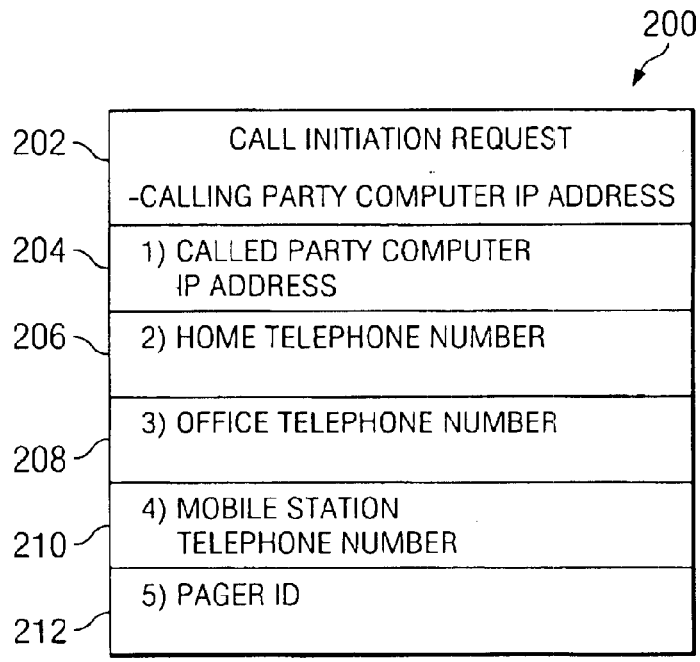
FIG. 2 shows an example of a call initiation data packet.

An example of a call initiation data packet 200 is shown in FIG. 2. The header 202 of call initiation data packet 200 indicates that the calling party at computer 102 desires to initiate a packet data network call. The header 202 identifies the calling party computer by its IP address. The use of IP addresses to identify computers in a packet data network is well known in the art. Each of the following fields 204, 206, 208, 210, 212, of the record 200 identify, in priority order, the alternative devices with which the calling party wishes to initiate communication. Thus, in the present example, call initiation data packet 200 contains IP address of the called party computer 146 in field 204, indicating that the calling party desires to initiate communication with the called party computer 146 if that computer is available (i.e. connected to the packet data network 110).

Upon receipt of the call initiation data packet 200 the packet data network node 112 will route the packet 200 through the routing network 116 to terminating packet data network node 118. In an advantageous embodiment the routing will be efficient in the sense that the call imitation data packet 200 will be routed to a terminating packet data network node (e.g. packet data network node 118) which is geographically close to the connection to the called party device. The routing of data packets through data networks is well known in the art and will not be described further herein.

Figure 3:
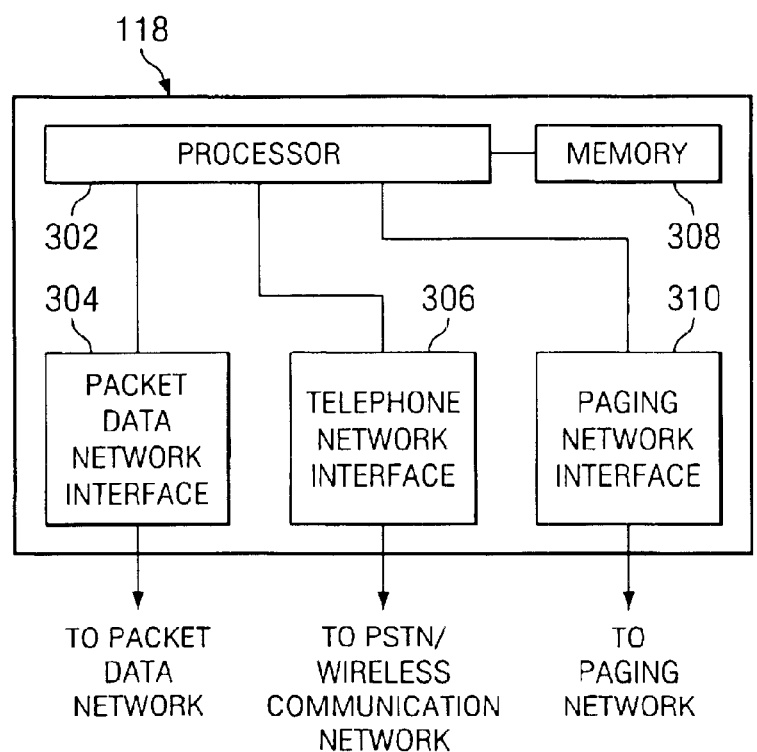
FIG. 3 is a block diagram of a packet network node.

Packet network node 118 is shown in further detail in FIG. 3. Packet network node 118 includes a processor 302 connected to a memory 308. The memory 308 contains computer program instructions which are executed by the processor 302 which control the operation of the packet network node. The memory 308 may be a RAM, ROM, magnetic disk, optical disk, or other type of computer storage medium. Further, memory 308 may be some combination of such computer storage media. Processor 302 is also connected to a packet data network interface 304 for communicating with the packet data network 110, a telephone network interface 306 for communicating with the PSTN 140 and the wireless communication network 130, and a paging network interface 310 for communicating with the paging network 160. Packet data network node 118 may also contain other components for carrying out other functions of the node (e.g. routing) but such other components are not described herein and would be well known to one skilled in the art. Although the functions of packet data network node 118 have been described herein as being controlled by processor 302 executing stored computer program instruction, it is to be understood that such functions could also be carried out by hardware, or a combination of software and hardware. It is also noted that packet data network node 112, as well as other packet data network nodes (not shown) in packet data network 110, may be configured as packet data network node 118 and may have the same functionality.

Figure 4:
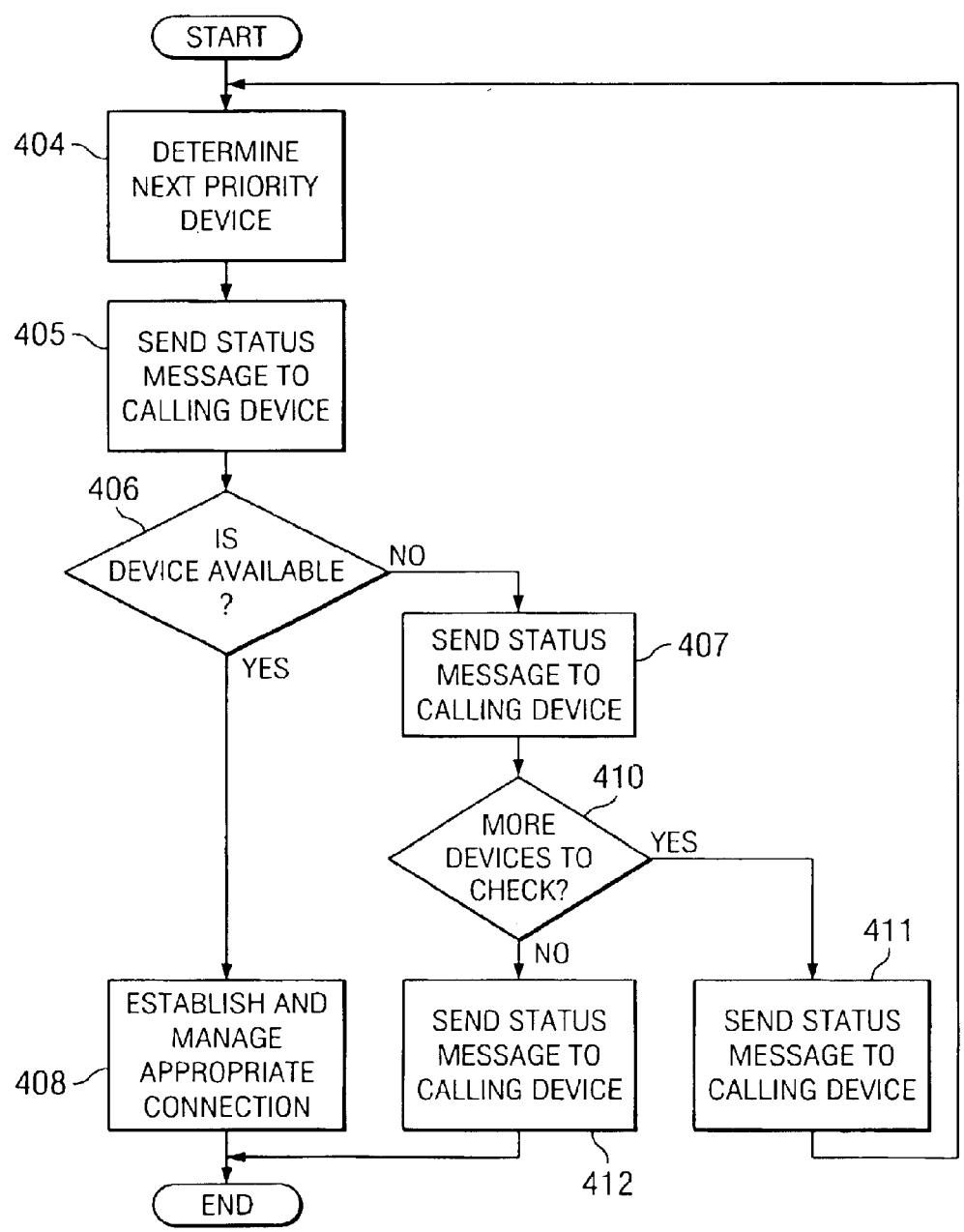
FIG. 4 if a flow chart of the steps performed by the packet data network node in accordance with the invention.

In accordance with the present invention, the packet data network node 118 performs the steps shown in the flowchart of FIG. 4 upon receipt of the call initiation data packet 200. In step 404 the next priority device is determined. Initially, this will be the first device indicated in the call initiation data packet 200, which in this example is the called party computer 146 as indicated by entry 204. In step 405 a status message is sent to the calling party computer 102 indicating that the packet data network node 118 is determining whether the next priority device (at this point in this example the called party computer 146) is available. In step 406 it is determined whether the device is available. Thus, in this example, packet data network node 118 will determine whether called party computer 146 is available (i.e. connected to the packet data network 110). As described above, if the called party only has one connection to LS 142, then such connection will be shared by a conventional telephone 144 and a computer 146. Generally, telephone 144 will be connected to the LS 142 so that telephone calls can be made and received over the PSTN 140. Called party computer 146 will only be connected to LS 142 when the called party wishes to communicate with the packet data network 110 via packet data network node 118.

In the current example, assume that called party computer 146 is connected to the packet data network node 118. In such a case, the packet data network node 118 will establish and manage the connection in step 408 as follows. The packet data network node 118 will indicate to the called party computer 146 that the calling party computer 102 wishes to initiate a telephony connection. The calling party computer 102 is identified to the called party computer 146 by forwarding the calling party computer IP address from header 202 of the call initiation data packet 200. The calling party computer 102 and the called party computer 146 may then engage in a packet data network telephony session in accordance with the software being executed by the computers.

In the scenario described above, it is assumed that if the called party computer 146 is connected to the packet data network 110, then it is available. However, in accordance with another embodiment of the invention, the called party computer 146 may be considered unavailable if there is no response at the called party computer 146, even though it may be connected to the packet data network 110. For example, the called party computer 146 may be connected to the packet data network 110, but the user of called party computer 146 may not be available for communication and thus may not respond to the call. In this situation, it is possible for the packet data network node 118 to recognize this situation and consider the called party computer 146 unavailable. Further processing in the event the called party computer 146 is considered unavailable is described below.

Assume now that called party computer 146 was not connected to the packet data network 110 upon receipt by the packet data network node 118 of the call initiation data packet 200. In such case, the determination in step 406 (FIG. 4) would be "no" and control would pass to step 407 and a status message will be sent to the calling party computer 102 indicating that the device being checked (in this example the called party computer 146) was not available. Control then passes to step 410 to determine if there are any more devices to check. In this example, there are additional devices to check, as indicated in fields 206, 208, 210, and 212 of the call initiation data packet 200. Control passes to step 411 and a status message is sent to the calling party computer 102 indicating that there are additional devices to check. In step 404 the home telephone would be selected as the next highest priority device as indicated by the home telephone number present in field 206 of call initiation data packet 200. In step 405 a status message is sent to the calling party computer 102 indicating that the packet data network node 118 is determining whether the home telephone is available. In step 406 it would be determined whether home telephone 144 is available. Such a determination may be made as follows. Packet data network node 118 attempts to place a call to telephone 144 by sending appropriate signals via telephone network interface 306 to LS 142. Upon receipt of such signals, LS 142 will attempt to ring telephone 144. If the called party picks up the telephone 144, that indicates that the device is available and control will proceed to step 408 in which the packet data network node 118 will establish and manage a telephone connection with telephone 144 as follows.

At this point calling party computer 102 is connected to the packet data network node 118 via a packet data network link. Called party telephone 144 is connected to the packet data network node 118 via a telephone link. Packet data network node 118 manages the connection by converting signals as follows. Calling party will speak into a microphone of calling party computer 102 and the telephony software in computer 102 will convert the voice signals into data packets which are suitable for transmission to the packet data network node 118 via the packet data network 110. Upon receipt of such data packets, packet data network node 118 will convert the data into voice signals which are appropriate for transmission to telephone 144 via the telephone link and will transmit those signals. The called party will hear the voice signals via the speaker on telephone 144. Conversely, when the called party speaks into telephone 144, voice signals will be transmitted via the telephone link to packet data network node 118. Upon receipt of such voice signals, packet data network node 118 will convert the voice signal into data which is appropriate for transmission to telephone 102 via data packets over the packet data network 110. Upon receipt of such data packets computer 102 will convert the data into voice signals in accordance with the telephony software in computer 102, and the calling party will hear the voice signals via a speaker attached to computer 102. The packet data network node 118 performs the above described conversions and processing under control of processor 302 (FIG. 3) by executing appropriate computer program instructions stored in memory 308.

It is possible that in step 406 it is determined that called party telephone 144 is not available. This may be a result of no answer at telephone 144 or a busy signal at telephone 144. In such a case, the determination in step 406 (FIG. 4) would be "no" and control would pass to step to step 407 and a status message will be sent to the calling party computer 102 indicating that the called party telephone was not available. Control then passes to step 4 to determine if there are any more devices to check. In this example, there are additional devices to check, as indicated in fields 208, 210, and 212 of the call initiation data packet 200 and an appropriate status message is sent to the calling party computer 102 in step 411. In step 404 the office telephone 149 would be selected as the next highest priority device as indicated by the office telephone number present in field 208 of call initiation data packet 200 and an appropriate status message is sent to the calling party computer 102 in step 405. In step 406 it would be determined whether office telephone 149 is available through PBX 148. Further processing with respect to office telephone 149 would be similar to the processing described above in conjunction with home telephone 144 and will not be described in detail.

If it were determined in step 406 that office telephone 149 is not available then the determination in step 406 (FIG. 4) would be "no", an appropriate status message would be sent to the calling party computer 102 in step 407, and control would pass to step 410 to determine if there are any more devices to check. In this example, there are additional devices to check, as indicated in fields 210, and 212 of the call initiation data packet 200 and an appropriate status message is sent to the calling party computer 102 in step 411. In step 404 the mobile station 138 would be selected as the next highest priority device as indicated by the mobile station telephone number present in field 210 of call initiation data packet 200, and an appropriate status message is sent to the calling party computer 102 in step 405. In step 406 it would be determined whether mobile station 138 is available through the MSC 132 and RBS 134 of the wireless telephone network 130. The processing of wireless telephone calls is well known in the art. Further processing with respect to mobile station 138 would be similar to the processing described above in conjunction with home telephone 144 and will not be described in detail.

If it were determined in step 406 that mobile station 138 is not available then the determination in step 406 (FIG. 4) would be "no", an appropriate status message would be sent to the calling party computer 102 in step 407, and control would pass to step 410 to determine if there are any more devices to check. In this example, there are additional devices to check, as indicated in field 212 of the call initiation data packet 200, and an appropriate status message is sent to the calling party computer 102 in step 411. In step 404 the pager 166 would be selected as the next highest priority device as indicated by the pager identification number present in field 212 of call initiation data packet 200. With respect to the pager, it is assumed that a pager is always available, and therefore the determination of step 406 will be true. This is because a pager is not a device which registers with the paging system. Instead, when a page is to be sent to the pager, a signal is transmitted to the entire coverage area, and it is assumed that the pager is operating within the area and that the message will be received. In step 408, the packet data network node 118 will transmit a paging message to paging terminal 162 via the paging network interface 310. Paging terminal 162 will in turn format the message and transmit an appropriate paging signal via antenna 164 to pager 166. Paging systems are will known in the art and the details of such a system will not be described herein.

If it were determined in step 4 that there were no more devices to check, then in step 412 the packet data network node 118 would send a message to the calling party computer 102 indicating that initiation of a call to the called party was unsuccessful because none of the devices identified in the call initiation data packet 200 were available.

In the embodiment described above, the packet data network node 118 determines the highest priority called party device which is available and establishes communication between the calling party device and the highest priority called party device which is available. In an alternate embodiment, the call initiation request contains information s describing alternative called party devices, but may not contain relative priority of each called party device. In this embodiment, the packet data network node attempts to initiate communication with all of the devices specified in the call initiation request concurrently by sending an appropriate request to each of the devices. The network node establishes communication between the calling party and the first called party device which responds to the request, or to the first called party device which becomes available.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method executable by a network node in a packet data network for establishing communication through the network node for a calling device, comprising:

receiving from the calling device a call initiation request including identifiers for identifying called party devices in a priority order;

determining in the priority order a called party device identified in the call initiation request which is available; and establishing a connection to the available called party device.

2. The method of claim 1, wherein establishing a connection includes establishing a connection to one of a wireless communication network, a public switched telephone network (PSTN), and a paging network.

3. The method of claim 1, wherein the called party devices include at least one device in one of a wireless communication network, a public switched telephone network (PSTN), and a paging network.

4. A method executable by a network node in a packet data network for establishing communication for a calling device through the network node to a device in another network, comprising:

receiving from the calling device a call initiation request identifying devices in a priority order;

determining in the priority order a device identified in the call initiation request which is available to receive a call from the calling device; and establishing a connection through another network to the available device.

5. The method of claim 4, wherein the other network includes one of a wireless communication network, a public switched telephone network (PSTN), and a paging network.

6. The method of claim 4, wherein the devices include at least one device in one of a wireless communication network, a public switched telephone network (PSTN), and a paging network.

7. A network node in a packet data network for establishing communication through the network for a calling device, comprising:

a plurality of interfaces to other networks;

a processor connected to the plurality of interfaces;

a memory connected to the processor; and computer program instructions stored in the memory for causing the processor to receive from the calling device a call initiation request identifying called party devices in a priority order, determine in the priority order a called party device identified in the call initiation request which is available, and establish a connection to the available called party device.

8. The network node of claim 7, wherein establishing a connection includes establishing a connection to one of a wireless communication network, a public switched telephone network (PSTN), and a paging network.

9. The method of claim 7, wherein the called party devices include at least one device in one of a wireless communication network, a public switched telephone network (PSTN), and a paging network.

10. A network node in a packet data network for establishing communication for a calling device through the packet data network to a device in another network, comprising:

a plurality of interfaces to other networks;

a processor connected to the plurality of interfaces;

a memory connected to the processor; and computer program instructions stored in the memory for causing the processor to receive from the calling device a call initiation request identifying devices in a priority order, determine in the priority order a device identified in the call initiation request which is available to receive a call from the calling device, and establish a connection through another network to the available device.

11. The network node of claim 10, wherein the other network includes one of a wireless communication network, a public switched telephone network (PSTN), and a paging network.

12. The network node of claim 10, wherein the devices include at least one device in one of a wireless communication network, a public switched telephone network (PSTN), and a paging network.

* * * * *